(12) United States Patent
Chen (10) Patent No.: US 12,333,031 B2
(45) Date of Patent: Jun. 17, 2025

(54) FLASH DRIVE LOCKED IN WIRELESS COMMUNICATION MANNER

(71) Applicant: MAKTAR INC., New Taipei (TW)

(72) Inventor: Liang-Hsin Chen, New Taipei (TW)

(73) Assignee: MAKTAR INC., New Taipei (TW)

( * ) Notice: Subject to any disclaimer, the term of this patent is extended or adjusted under 35 U.S.C. 154(b) by 701 days.

(21) Appl. No.: 17/544,857

(22) Filed: Dec. 7, 2021

(65) Prior Publication Data

US 2023/0036703 A1 Feb. 2, 2023

(30) Foreign Application Priority Data

Aug. 2, 2021 (TW) ................................ 110128253

(51) Int. Cl.
*G06F 21/62* (2013.01)
*G06F 21/30* (2013.01)
*G06F 21/44* (2013.01)
*H04W 12/069* (2021.01)

(52) U.S. Cl.
CPC ............ *G06F 21/62* (2013.01); *G06F 21/305* (2013.01); *G06F 21/44* (2013.01); *H04W 12/069* (2021.01)

(58) Field of Classification Search
CPC ........ G06F 21/62; G06F 21/305; G06F 21/44; H04W 12/069; H04W 12/47
See application file for complete search history.

(56) References Cited

U.S. PATENT DOCUMENTS

| 2016/0028713 A1* | 1/2016 | Chui ....................... G06F 21/35 726/4 |
| 2016/0048465 A1* | 2/2016 | Chuang .................. H04W 12/50 711/163 |
| 2017/0026385 A1* | 1/2017 | Zarkesh ................... H04W 4/80 |

* cited by examiner

*Primary Examiner* — Thaddeus J Plecha
(74) *Attorney, Agent, or Firm* — ANOVA LAW GROUP, PLLC (57) ABSTRACT

A flash drive locked by using wireless communication that is applicable to a mobile device is provided. The mobile device includes a mobile communication component and a mobile control component. The flash drive includes a connection port, an information storing component, a communication component, an identification certificate component and a control component. The information storing component stores information. The identification certificate component stores identification information of the flash drive. When the communication component communicates with the mobile communication component, the communication component transmits a locking command generated by the mobile control component from the mobile communication component to the control component. The control component, according to the locking command, locks the identification certificate component and the data storing component, thereby prohibiting the flash drive from being identified and accessed by an electronic device having a slot into which the connection port of the flash drive is inserted into.

10 Claims, 6 Drawing Sheets

FLASH DRIVE LOCKED IN WIRELESS COMMUNICATION MANNER

CROSS-REFERENCE TO RELATED PATENT APPLICATION

This application claims the benefit of priority to Taiwan Patent Application No. 110128253, filed on Aug. 2, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a flash drive, and more particularly to a flash drive locked by using wireless communication.

BACKGROUND OF THE DISCLOSURE

With advancement of information technologies, more and more information can be stored in various storage devices such as flash drives. The flash drives are lightweight and easy to carry. The flash drives can be inserted into electronic devices and then used by the electronic devices at any time. Therefore, the flash drives are widely used in people's daily lives. However, since the information stored in the flash drives cannot be hidden from plying eyes, when the flash drive is lost or stolen, the information stored in the flash drives can easily be leaked.

SUMMARY OF THE DISCLOSURE

In response to the above-referenced technical inadequacies, the present disclosure provides a flash drive locked by using wireless communication, which is applicable to a plurality of mobile devices. Each of the plurality of mobile devices includes a mobile communication component and a mobile control component. The mobile control component is connected to the mobile communication component. The mobile control component is configured to control the mobile communication component to operate. The flash drive includes a connection port, an information storing component, an identification certificate component, a communication component and a control component. The connection port is inserted into a slot of an electronic device. The information storing component is configured to store information. The identification certificate component is configured to store identification information of the flash drive. The communication component is configured to transmit a locking command generated by the mobile control component from the mobile communication component when the communication component communicates with the mobile communication component. The control component is connected to the communication component, the identification certificate component, the information storing component and the connection port. The control component locks the identification certificate component and the information storing component according to the locking command from the communication component. When the flash drive is locked, the flash drive is prohibited from being identified by the electronic device having the slot into which the connection port of the flash drive is inserted, and the information stored in the information storing component and the identification information stored in the identification certificate component are prohibited from being accessed by the electronic device.

In certain embodiments, each of the communication component and the mobile communication component includes a near field communication component.

In certain embodiments, when the control component receives an unlocking command generated by the mobile control component from the mobile communication component through the communication component, the control component unlocks the identification certificate component and the information storing component according to the unlocking command. When the flash drive is unlocked, the information of the flash drive is allowed to be accessed by the electronic device having the slot into which the connection port of the flash drive is inserted.

In certain embodiments, when the control component receives an information clearing command generated by the mobile control component from the mobile communication component through the communication component, the control component instructs the information storing component to clear the information stored in the information storing component according to the information clearing command.

In certain embodiments, when the control component determines that the connection port of the flash drive is pulled out of the slot of the electronic device, the control component automatically locks the information storing component and/or instructs the information storing component to clear the information stored in the information storing component.

In certain embodiments, an application is installed in each of the plurality of mobile devices. When the communication component of the flash drive communicates with the mobile communication component of one of the plurality of mobile devices, the identification information of the flash drive is recorded by the application and is displayed on a page of the application opened by the one of the plurality of mobile devices.

In certain embodiments, when the mobile control component of one of the plurality of mobile devices receives a locking request applied to the identification information on the page of the application opened by the one of the plurality of mobile devices, the mobile communication component of the one of the plurality of mobile devices outputs the locking command to the communication component of the flash drive. The control component of the flash drive receives the locking command through the communication component. The control component of the flash drive locks the information storing component and the identification certificate component of the flash drive according to the locking command.

In certain embodiments, when the mobile control component of one of the plurality of mobile devices receives an unlocking request applied to the identification information on the page of the application opened by the one of the plurality of mobile devices, the mobile communication component of the one of the plurality of mobile devices outputs an unlocking command to the communication component of the flash drive. The control component of the flash drive receives the unlocking command through the communication component. The control component of the flash drive unlocks the information storing component and the identification certificate component of the flash drive according to the unlocking command.

In certain embodiments, permission to share the flash drive and to access and/or modify the information of the flash drive is granted to other electronic devices through the application on each of the plurality of mobile devices.

In certain embodiments, on the application of any one of the plurality of mobile devices, a restriction condition on use of the flash drive is set for other ones of the plurality of mobile devices or accounts. When a state that the flash drive is used by the other ones of the plurality of mobile devices or the accounts reaches the restriction condition, permission granted to the other ones of the plurality of mobile devices or the accounts is automatically revoked.

As described above, the present disclosure provides the flash drive locked by using the wireless communication, which has the following characteristics:

1. if the user intends to use a mobile device to control the flash drive, the user only needs to hold the flash drive and move the flash drive close to the mobile device such that the flash drive communicates with the mobile device (via the near field communication components) without remembering the account number and the password and manually entering the account number and the password on the mobile device;
2. before the flash drive is inserted into the electronic device (such as a laptop computer or a desktop computer), the mobile device can communicate with the flash drive (remotely or via the near field communication components) and can be used to preset the flash drive, for example, to be in the locked state or the unlocked state;
3. the flash drives stores different unique identification information, and the mobile device can identify and set the flash drives according to the unique identification information of the flash drives;
4. (on an application in the mobile device) an owner of the flash drive can set the flash drive to be shared with other people, and can set deadlines and a number of times that the other people are allowed to use the flash drive, for example, the other people are only allowed to use the flash drive once;
5. (on the application in the mobile device) the owner of the flash drive can set the permissions that the sharers are granted to use the flash drives, for example, the sharers can be granted access (to modify) the information of the flash drive; and
6. on the application of the mobile device, the flash drive can be set such that the flash drive is automatically locked or the information of the flash drive is automatically deleted after the flash drive is used, thereby preventing the information of the flash drive from being leaked to other people when the flash drive is lost, and improving information security.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
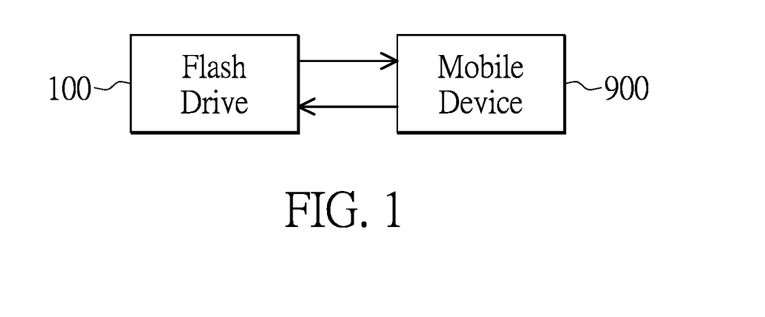
FIG. 1 is a block diagram of a flash drive locked by using wireless communication and a mobile device according to an embodiment of the present disclosure.
Figure 2:
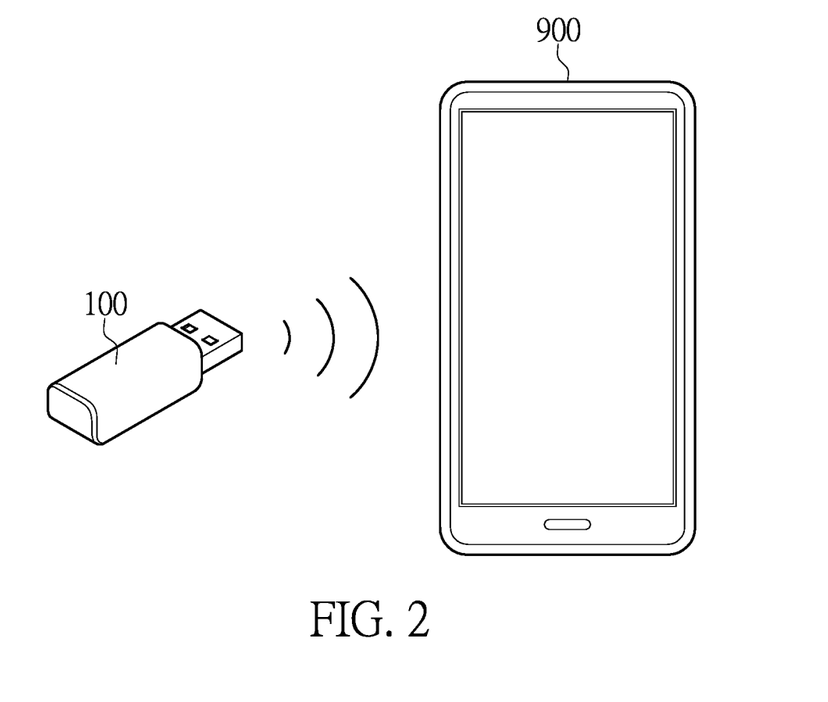
FIG. 2 is a schematic diagram of the flash drive locked by using the wireless communication and the mobile device according to the embodiment of the present disclosure.
Figure 3:
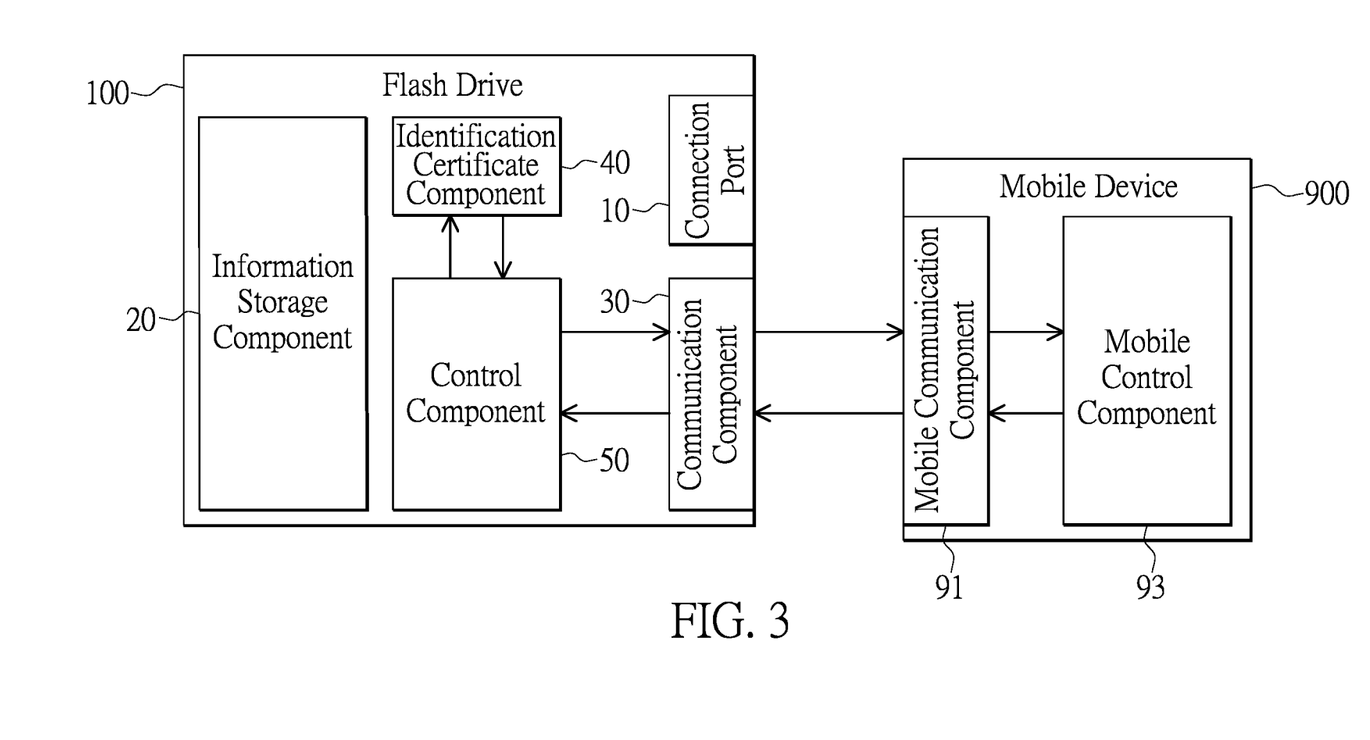
FIG. 3 is a block diagram of components inside the flash drive locked by using the wireless communication and the mobile device according to the embodiment of the present disclosure.

Reference is made to FIGS. 1 to 3, in which FIG. 1 is a block diagram of a flash drive locked by using wireless communication and a mobile device according to an embodiment of the present disclosure, FIG. 2 is a schematic diagram of the flash drive locked by using the wireless communication and the mobile device according to the embodiment of the present disclosure, and FIG. 3 is a block diagram of components inside the flash drive locked by using the wireless communication and the mobile device according to the embodiment of the present disclosure.

As shown in FIG. 1, a flash drive 100 of the embodiment of the present disclosure can communicate with a mobile device 900, and a state of the flash drive 100 can be controlled by the mobile device. In practice, the flash drive 100 may be replaced with other portable storage devices, and the mobile device 900 may be a mobile phone as shown in FIG. 2, but the present disclosure is not limited thereto.

As shown in FIG. 3, the flash drive 100 may include an information storing component 20, a communication component 30, an identification certificate component 40 and a control component 50. The control component 50 may be connected to the communication component 30 and the identification certificate component 40. For the convenience of explanation, in the embodiment, the communication component 30 and the identification certificate component 40 are separately disposed from each other, but the present disclosure is not limited thereto. In practice, the communication component 30 and the identification certificate component 40 may be combined together.

A mobile communication component 91 and a mobile control component 93 may be disposed inside the mobile device 900. The mobile control component 93 may be connected to the mobile communication component 91. The mobile control component 93 may be configured to control the mobile communication component 91 to operate.

The communication component 30 of the flash drive 100 may communicate with the mobile communication component 91 of the mobile device 900. For example, each of the communication component 30 and the mobile communication component 91 may include a near field communication (NFC) component. The near field communication component of the flash drive 100 can communicate with the near field communication component of the mobile device 900.

When the flash drive 100 communicates with the mobile device 900, the mobile control component 93 of the mobile device 900 may output a locking command to the communication component 30 of the flash drive 100 through the mobile communication component 91 of the mobile device 900. Then, when the control component 50 of the flash drive 100 receives the locking command through the communication component 30, the control component 50 of the flash drive 100 locks the identification certificate component 40 and the information storing component 20 of the flash drive 100 according to the locking command.

When the flash drive 100 is locked by the control component 50, the flash drive 100 is prohibited from being identified by the electronic device having a slot in which a connection port 10 of the flash drive 100 is inserted into, and the information of the flash drive 100 is prohibited from being accessed by the electronic device. That is, when the connection port 10 of the locked flash drive 100 is inserted into the slot of the electronic device, the electronic device does not perform any operation on the locked flash drive 100 and a user cannot read any information of the flash drive 100 on the electronic device.

Further, when the flash drive 100 communicates with the mobile device 900, the mobile control component 93 of the mobile device 900 may output an unlocking command to the communication component 30 of the flash drive 100 through the mobile communication component 91 of the mobile device 900. Then, when the control component 50 of the flash drive 100 receives the unlocking command through the communication component 30, the control component 50 of the flash drive 100 unlocks the identification certificate component 40 and the information storing component 20 of the flash drive 100 according to the unlocking command.

When the flash drive 100 is unlocked and communicates with the mobile device 900, the mobile control component 93 of the mobile device 900 may output an identifying command to the communication component 30 of the flash drive 100 through the mobile communication component 91 of the mobile device 900. The control component 50 of the flash drive 100 may receive the identifying command through the communication component 30. Then, the control component 50 of the flash drive 100 may, according to the identifying command, control the identification certificate component 40 to provide identification information such as a unique identification code of the flash drive 100 to the control component 50. Then, the control component 50 transmits the identification information to the mobile control component 93 of the mobile device 900 sequentially through the communication component 30 and the mobile communication component 91. The mobile control component 93 of the mobile device 900 may identify the flash drive 100 according to the identification information.

As described above, the mobile device 900 is only used to lock and unlock the flash drive 100, but the present disclosure is not limited thereto.

If necessary, when the flash drive 100 communicates with the mobile device 900 and the flash drive 100 is unlocked, information is transmitted between the flash drive 100 and the mobile device 900. The information of the flash drive 100 may be backed up to the mobile device 900 or the information of the mobile device 900 may be backed up to the flash drive 100. For example, the mobile control component 93 of the mobile device 900 may output an information storing command and the information to the communication component 30 of the flash drive 100 through the mobile communication component 91. The control component 50 of the flash drive 100 receives the information storing command from the mobile communication component 91 of the mobile device 900 through the communication component 30. The control component 50, according to the information storing command, instructs the information storing component 20 of the flash drive 100 to store the information provided by the flash drive 100.

If necessary, the mobile control component 93 of the mobile device 900 may output an information clearing command to the communication component 30 of the flash drive 100 through the mobile communication component 91. The control component 50 of the flash drive 100 receives the information clearing command from the mobile communication component 91 of the mobile device 900 through the communication component 30. The control component 50, according to the information clearing command, instructs the information storing component 20 of the flash drive 100 to clear the information stored in the information storing component 20.

Figure 4:
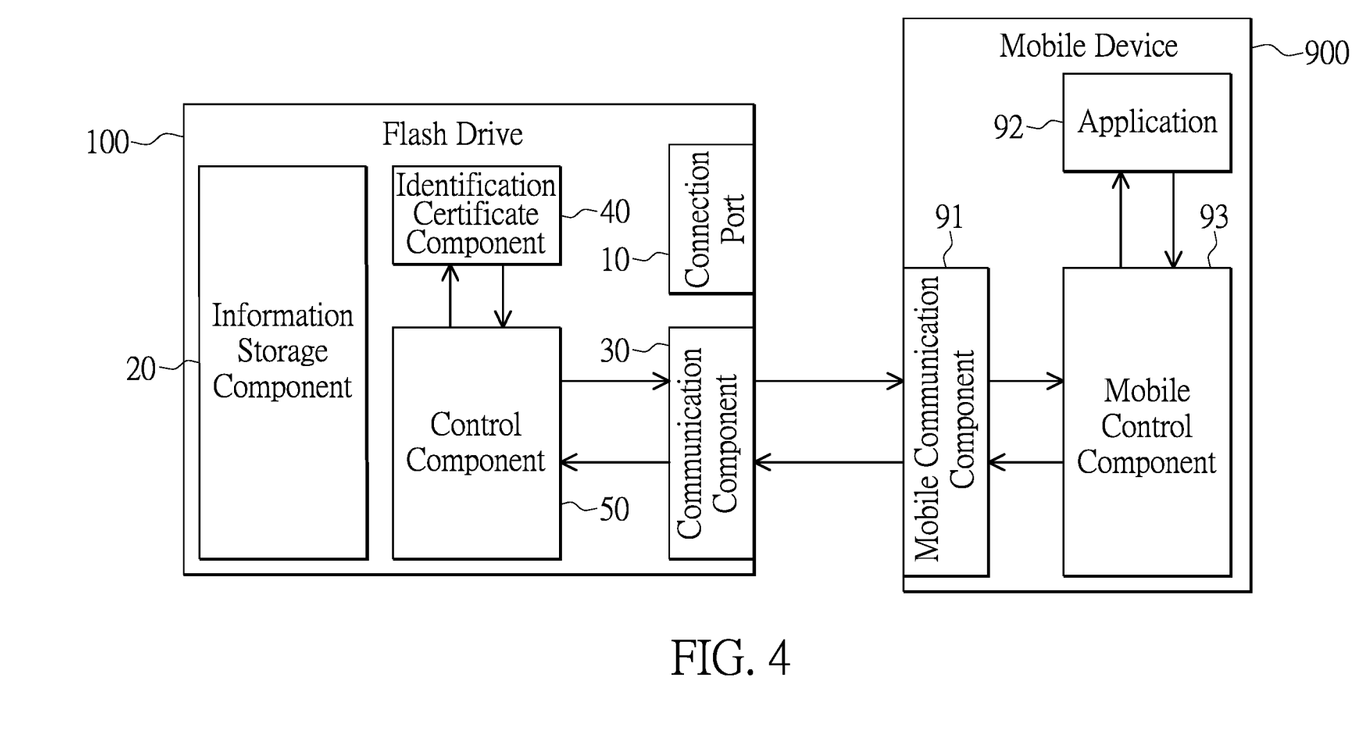
FIG. 4 is a block diagram of components inside the flash drive locked by using the wireless communication and the mobile device according to the embodiment of the present disclosure.

Reference is made to FIGS. 1, 2 and 4, in which FIG. 4 is a block diagram of components inside the flash drive locked by using the wireless communication and the mobile device according to the embodiment of the present disclosure. The same descriptions are not repeated herein.

As shown in FIG. 4, an application 92 may be installed in the mobile device 900. When the flash drive 100 communicates with the mobile device 900 for the first time, the application 92 can receive the identification information of the flash drive 100 through the mobile device 900 and record the identification information, and the identification information can be displayed on a page of the application 92 opened by the mobile device 900.

The user may touch a touch screen of the mobile device 900 and click (options such as a locking option, an unlocking option, an information clearing option and an information storing options of) the identification information on the page of the application 92 opened by the mobile device 900 to trigger the mobile device 900 to issue corresponding commands (such as the locking command, the unlocking command, the information clearing command and the information storing command).

For example, when the mobile control component 93 of the mobile device 900 receives a locking request applied to the identification information on the page of the application opened by the mobile device 900, the mobile control component 93 of the mobile device 900 outputs the locking command to the communication component 30 of the flash drive 100 through the mobile communication component 91. The control component 50 of the flash drive 100 locks the identification certificate component 40 and the information storing component 20 according to the locking command from the communication component 30.

When the mobile control component 93 receives an unlocking request applied to the identification information on the page of the application 92 opened by the mobile device 900, the mobile control component 93 of the mobile device 900 outputs the unlocking command to the communication component 30 through the mobile communication component 91. The control component 50 of the flash drive 100 unlocks the identification certificate component 40 and the information storing component 20 according to the locking command from the communication component 30.

Figure 5:
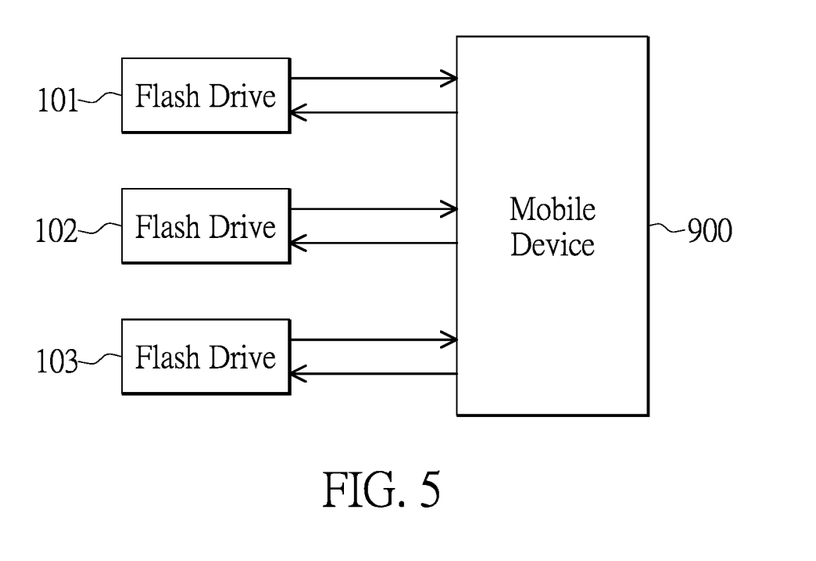
FIG. 5 is a block diagram of the flash drives locked by using the wireless communication and the mobile device according to the embodiment of the present disclosure.

Reference is made to FIG. 5, which is a block diagram of the flash drives locked by using the wireless communication and the mobile device according to the embodiment of the present disclosure. The same descriptions are not repeated herein.

As shown in FIG. 5, the mobile device 900 may obtain identification information of a plurality of flash drives 101 to 103, and may control (locked or unlocked) states of the flash drives 101 to 103 according to the identification information of the flash drives 101 to 103, but the present disclosure is not limited thereto. In practice, the mobile device 900 may control less or more flash drives.

When the flash drives 101 to 103 communicate with the mobile device 900 for the first time, the flash drives 101 to 103 may provide their identification information to the mobile device 900, and the mobile device 900 may provide its identification information to the flash drives 101 to 103. The flash drives 101 to 103 are automatically or manually bound only to the mobile device 900 that is earliest to communicate with the flash drives 101 to 103, according to the identification information of the flash drives 101 to 103 and the mobile device 900. The flash drives 101 to 103 do not further communicate with other mobile devices other than the mobile device 900, and thus the other mobile devices are not allowed to control and use the flash drives 101 to 103.

Alternatively, when the flash drives 101 to 103 communicate with the mobile device such as the mobile device 900 first, an account number and/or a password of an account are automatically entered into an application on the mobile device 900 such that the user is logged into the application. Then, the application may automatically obtain and record the identification information of the flash drives 101 to 103, and accordingly bind the account with the flash drives 101 to 103 on the mobile device 900.

When the account number and/or the password are entered into the application such that the user is logged into the application on the mobile device 900 or other mobile devices, the application can be used to issue the commands such as the locking command or the unlocking command to each of the flash drives 101 to 103 on the mobile device 900 or the other mobile devices. The account number or the password may be set to be a unique identification code of each of the flash drives 101 to 103. The unique identification code can be automatically identified such that the user is successfully logged into the application without manually entering the account number or the password to the application.

In practice, on the mobile device 900 or the account of the application that is bound to the flash drives 101 to 103, the flash drives 101 to 103 may be set such that one or more of other mobile devices are granted permission to share and use one or more of the flash drives 101 to 103. That is, a state of each of the flash drives 101 to 103 can be controlled and used by multiple ones of the mobile devices. The mobile devices can share the flash drives 101 to 103. Sharing conditions and qualifications may be determined, for example, on one of the mobile devices such as the mobile device 900 that is earliest to bind and communicate with the flash drives 101 to 103, or on the application when the user is logged into one of the accounts of the application.

On the application opened by the mobile device 900 or on a personal account page of the application that is earliest to bound and communicate with the flash drives 101 to 103, permissions granted to other mobile devices or other accounts of the application to use the flash drive 101 to 103 may be set. For example, the other mobile devices or the other accounts of the application are only granted permission to read information of the flash drives 101 to 103 (in a read-only mode). Alternatively, the other mobile devices or the other accounts of the application may be granted permission to read, copy and modify the information of the flash drives 101 to 103, and validity of the granted permissions may be set. For example, the permissions may be granted to the other mobile devices or the other accounts of the application permanently or only within a specified time.

Restriction conditions (such as a limited number of times, a limited time interval, a limited time length and so on) on use of the flash drives 101 to 103 for sharers may be set on the application. When the flash drives 101 to 103 are used by the sharers, a state of the flash drives 101 to 103 may reach the restriction conditions. For example, a current cumulative number of times that the flash drives 101 to 103 are used reaches a threshold value, a time interval within which the flash drives 101 to 103 are used exceeds a preset time interval, and/or a length of a current cumulative time within which the flash drives 101 to 103 are used reaches a time length threshold. Under this condition, the permissions granted to the other mobile devices to use the flash drives 101 to 103 are automatically revoked such that the other mobile devices are prohibited from using the flash drives 101 to 103, the flash drives 101 to 103 are automatically locked, and/or the information stored in the flash drives 101 to 103 are automatically deleted.

The current cumulative number of times that the flash drives 101 to 103 are used by the sharer may include one or more of: a number of times that the mobile device 900 communicate with the flash drives 101 to 103, a number of times that the flash drives 101 to 103 are inserted into the electronic device, and a number of times that the mobile device 900 issues the commands to the flash drives 101 to 103. Alternatively or in addition, the current cumulative number of times that the flash drives 101 to 103 are used by the sharer may include one or both of: a number of times that the flash drives 101 to 103 are locked by the mobile device 900, and a number of times that the flash drives 101 to 103 are unlocked by the mobile device 900. Alternatively or in addition, the current cumulative number of times that the flash drives 101 to 103 are used by the sharer may include one or more of: a number of times that information is transmitted between the flash drives 101 to 103 and the electronic device, a number of times that the information stored in the flash drives 101 to 103 is accessed by the electronic device, and a number of times that the information stored in the flash drives 101 to 103 is accessed by the application when the user is logged into one of the accounts of the application. Alternatively or in addition, the current cumulative number of times that the flash drives 101 to 103 are used by the sharer may include one or more of: a number of times that the information stored in the flash drives 101 to 103 is modified on the electronic device, and a number of times that the information stored in the flash drives 101 to 103 is modified by the application when the user is logged into one of the accounts of the application.

If necessary, the flash drive 100 may include a playback component. The playback component may be used to display different patterns, play different sounds or emit different light beams that respectively represent different states of the flash drive 100. For example, the playback component may display a light guide locking head pattern (including a locked locking head pattern that represents the flash drive 100 in a locked state, and an unlocked locking head pattern that represents the flash drive 100 in an unlocked state).

Figure 6:
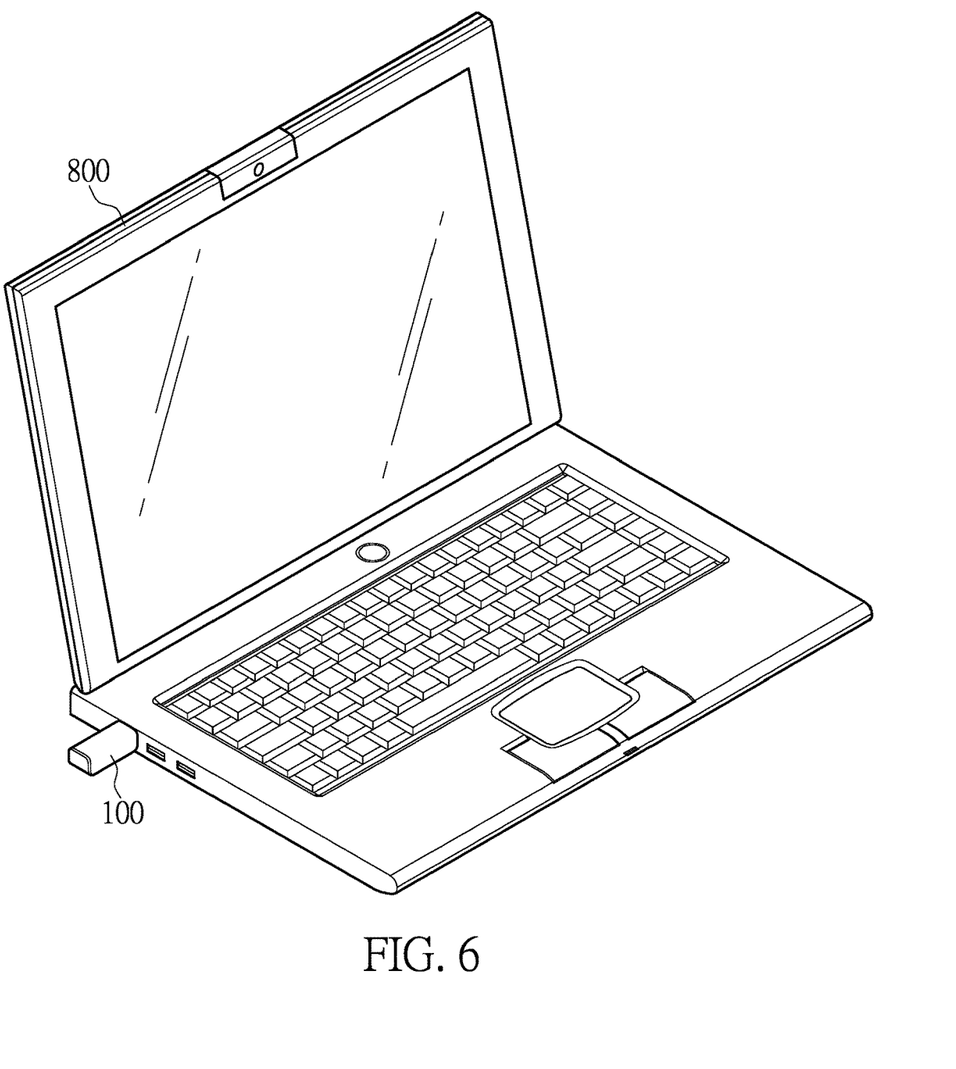
FIG. 6 is a schematic diagram of the flash drive locked by using the wireless communication and an electronic device according to the embodiment of the present disclosure.
Figure 7:
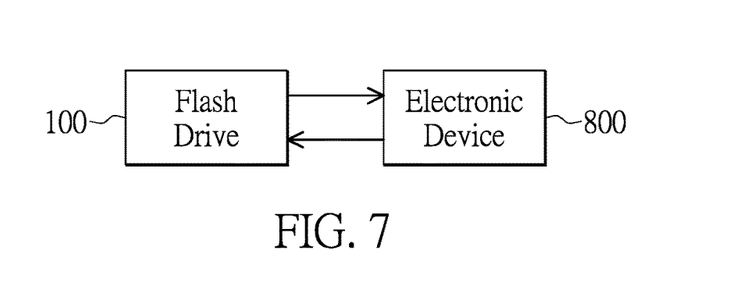
FIG. 7 is a block diagram of the flash drive locked by using the wireless communication and the electronic device according to the embodiment of the present disclosure.
Figure 8:
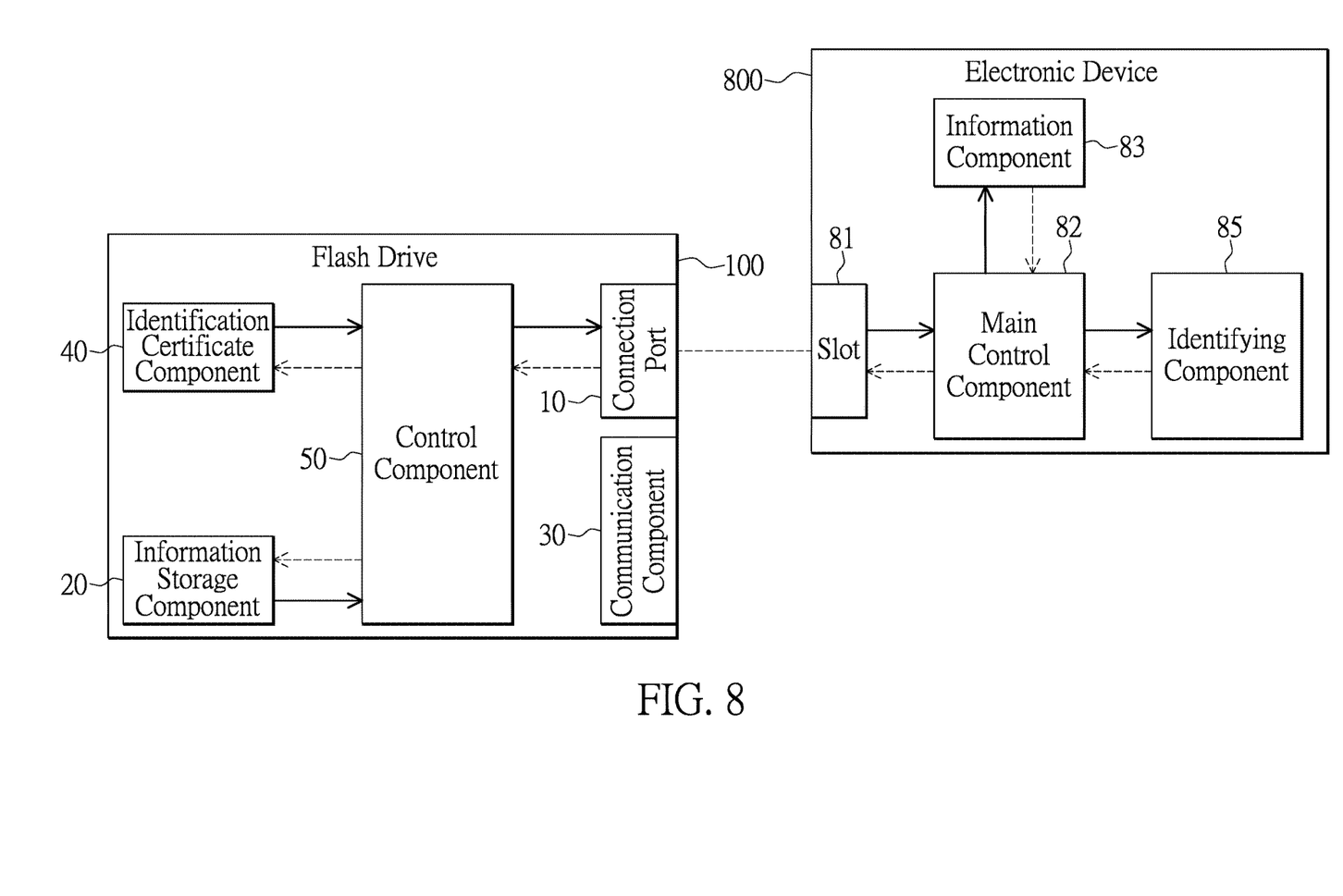
FIG. 8 is a block diagram of components inside the flash drive locked by using the wireless communication and the electronic device according to the embodiment of the present disclosure.

Reference is made to FIGS. 1 to 4 and FIGS. 6 to 8, in which FIG. 6 is a schematic diagram of the flash drive locked by using the wireless communication and an electronic device according to the embodiment of the present disclosure, FIG. 7 is a block diagram of the flash drive locked by using the wireless communication and the electronic device according to the embodiment of the present disclosure, and FIG. 8 is a block diagram of components inside the flash drive locked by using the wireless communication and the electronic device according to the embodiment of the present disclosure.

A connection port 10 (such as a USB connection port) of the flash drive 100 may be inserted into a slot 81 (such as a USB slot) of an electronic device 800. When the connection port 10 of the flash drive 100 is inserted into the slot 81 of the electronic device 800, information may be transmitted between the flash drive 100 and the electronic device 800.

In detail, when the flash drive 100 is unlocked and the connection port 10 of the flash drive 100 is inserted into the slot 81 of the electronic device 800, the control component 50 of the flash drive 100 can be connected to a main control component 82 of the electronic device 800. At this time, the main control component 82 of the electronic device 80 may obtain the identification information such as the unique identification code that is stored in the identification certificate component 40 from the control component 50 of the flash drive 100. Then, the main control component 82 may transmit the identification information to an identifying component 85 of the electronic device 800. The identifying component 85 of the electronic device 800 may identify and authenticate the identification information of the flash drive 100.

After the identifying component 85 of the electronic device 800 successfully identifies the identification information of the flash drive 100, the main control component 82 of the electronic device 800 may receive the information stored in the information storing component 20 of the flash drive 100 from the control component 50 of the flash drive 100. In addition or alternatively, the main control component 82 of the electronic device 800 may provide information of an information component 83 of the electronic device 800 to the control component 50 of the flash drive 100. Then, the control component 50 of the flash drive 100 may transmit the information to be stored in the information storing component 20 of the flash drive 100 to back up the information of the electronic device 800 to the flash drive 100.

Conversely, when the connection port 10 of the flash drive 100 is locked and inserted into the slot 81 of the electronic device 800, the electronic device 800 cannot identify the flash drive 100, and the electronic device 800 cannot read and obtain the information of the flash drive 100.

In summary, the present disclosure provides the flash drive locked by using the wireless communication, which has the following characteristics:

1. if the user intends to use the mobile device to control the flash drive, the user only needs to hold the flash drive and move the flash drive close to the mobile device such that the flash drive communicates with the flash drive (via the near field communication components) without remembering the account number and the password and manually entering the account number and the password on the mobile device;
2. before the flash drive is inserted into the electronic device (such as a laptop computer or a desktop computer), the mobile device can communicate with the flash drive (remotely or via the near field communication components) and can be used to preset the flash drive, for example, to be in the locked state or the unlocked state;
3. the flash drives stores different unique identification information, and the mobile device can identify and set the flash drives according to the unique identification information of the flash drives;
4. (on an application in the mobile phone) an owner of the flash drive can set the flash drive to be shared with other people, and can set deadlines and a number of times that the other people are allowed to use the flash drive, for example, the other people are only allowed to use the flash drive once.
5. (on the application in the mobile phone) the owner of the flash drive can set the permissions that the sharers are granted to use the flash drives, for example, the sharers can be granted permission to access (and to modify) the information of the flash drive;
6. on the application of the mobile device, the flash drive can be set such that the flash drive is automatically locked or the information of the flash drive is automatically deleted after the flash drive is used, thereby preventing the information of the flash drive from being leaked to other people when the flash drive is lost, and improving information security.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A flash drive being applicable to be locked by a plurality of mobile electronic devices through a wireless communication, wherein each of the plurality of mobile electronic devices includes a first wireless interface, and the flash drive comprises:
a microcontroller;
an electrical connector, being coupled to the microcontroller, and being adopted for being electrically connected to a first electronic device;
at least one storage chip storing an identification information and instructions, being coupled to the microcontroller, and is adopted for storing a data; and
a second wireless interface, being coupled to the microcontroller;
wherein the microcontroller executes the instructions so as to be configured to:
switch, after receiving a locking command from the mobile electronic device, the flash drive to be in an access locking state; and
switch, after receiving an unlocking command from the mobile electronic device, the flash drive to be in an accessible state;
wherein the first electronic device electrically connected to the electrical connector is prohibited from accessing the flash drive while the flash drive stays in the access locking state, the access locking state prohibiting the first electronic device from identifying the flash drive by prohibiting access to the identification information;
wherein the flash drive is accessible for, in case of staying in the accessible state, the first electronic device that is electronically connected to the electrical connector;
wherein after the first electronic device is electrically connected to the flash drive staying in the accessible state, the first electronic device identifies the flash drive by reading out the identification information from the storage chip.

2. The flash drive according to claim 1, wherein the first wireless interface comprises a first near field communication (NFC) unit, and the second wireless interface comprises a second NFC unit for in communication with the first NFC unit.

3. The flash drive according to claim 2, wherein the mobile electronic device is installed with an application program therein, and after the application program is executed the mobile electronic device is configured to:
show, a user interface (UI) for being operated in order to manage the flash drive.

4. The flash drive according to claim 1, wherein the microcontroller is further configured to:
erase, after receiving a data clearing command from the mobile device, the identification information and the data stored in the storage chip.

5. The flash drive according to claim 1, wherein the microcontroller is further configured to:
switch, after the first electronic device is operated to disconnect the electrical connector, the flash drive to be in the access locking state.

6. The flash drive according to claim 3, wherein the microcontroller is further configured to:
transmit, after the identification information is read out by the first electronic device, the identification information to the mobile electronic device through the second wireless interface;
wherein after receiving the identification information, the mobile electronic device shows the identification information on the user interface.

7. The flash drive according to claim 3, wherein the mobile electronic device is further configured to:
transmit, after a locking request is generated by the user interface, the locking command to the second wireless interface via the first wireless interface thereof.

8. The flash drive according to claim 3, wherein the mobile electronic device is configured to:
transmit, after an unlocking request is generated by the user interface, the unlocking command to the second wireless interface via the first wireless interface thereof.

9. The flash drive according to claim 3, wherein the mobile electronic device is further configured to:
permit, after a data sharing list including the first electronic device and/or at least one second electronic device is generated by the user interface, the first electronic device and/or the second electronic device to share the data stored in the storage ship.

10. The flash drive according to claim 3, wherein the plurality of mobile electronic device consists of a host mobile electronic device and N numbers of slave mobile electronic devices, and the host mobile electronic device executing the application program so as to configured to:
permit, the N numbers of slave mobile electronic devices to access the flash drive;
set, N numbers of restriction conditions for the N numbers of slave mobile electronic devices; and
store, the N numbers of restriction conditions in the storage chip;
wherein any one of the N numbers of slave mobile electronic devices is permitted to access the flash drive before the corresponding restriction condition is reached.

* * * * *